United States Patent [19]

Ishihara

[11] 4,253,754
[45] Mar. 3, 1981

[54] MIRROR-SHUTTER DEVICE IN SINGLE-LENS REFLEX CAMERA

[75] Inventor: Satoshi Ishihara, Urawa, Japan

[73] Assignee: Mamiya Koki Kabushiki Kaisha, Tokyo, Japan

[21] Appl. No.: 91,827

[22] Filed: Nov. 6, 1979

[51] Int. Cl.³ .............................................. G03B 19/12
[52] U.S. Cl. .................................................. 354/154
[58] Field of Search ............... 354/152, 154, 155, 156, 354/234, 261

[56] References Cited

U.S. PATENT DOCUMENTS

| | | | |
|---|---|---|---|
| 1,352,449 | 9/1920 | Harris | 354/152 |
| 2,356,880 | 8/1944 | Pignone | 354/154 |
| 3,304,848 | 2/1967 | Steisslinger et al. | 354/154 |
| 3,533,343 | 10/1970 | Kobayashi et al. | 354/156 |

FOREIGN PATENT DOCUMENTS

Ad.39808  12/1931  France .................... 354/152

*Primary Examiner*—Donald A. Griffin

*Attorney, Agent, or Firm*—Robert E. Burns; Emmanuel J. Lobato; Bruce L. Adams

[57] ABSTRACT

The mirror of a single-lens reflex camera is supported on a swinging leading shutter swung upward by a rotary solenoid, the mirror thus being moved upward from its viewfinding position to its picture taking position, an aperture for passing stroboscopic light to the camera film being formed between this shutter and a trailing shutter held in cocked state by a resiliently urged latch lever. The trailing shutter is then released and swings upward into aperture closing contact with the leading shutter, the two shutters then being lowered to their positions for viewfinding, at which the trailing shutter is again locked for the succeeding shutter operation. The trailing shutter has a stud member fixed thereto which is locked, in the lowered position of the trailing shutter, by the latch lever. A buttressing bracket is provided with which the stud member is brought into contact in its locked state for accurate positioning thereof thereby to assure regular release timing of the latch lever.

5 Claims, 12 Drawing Figures

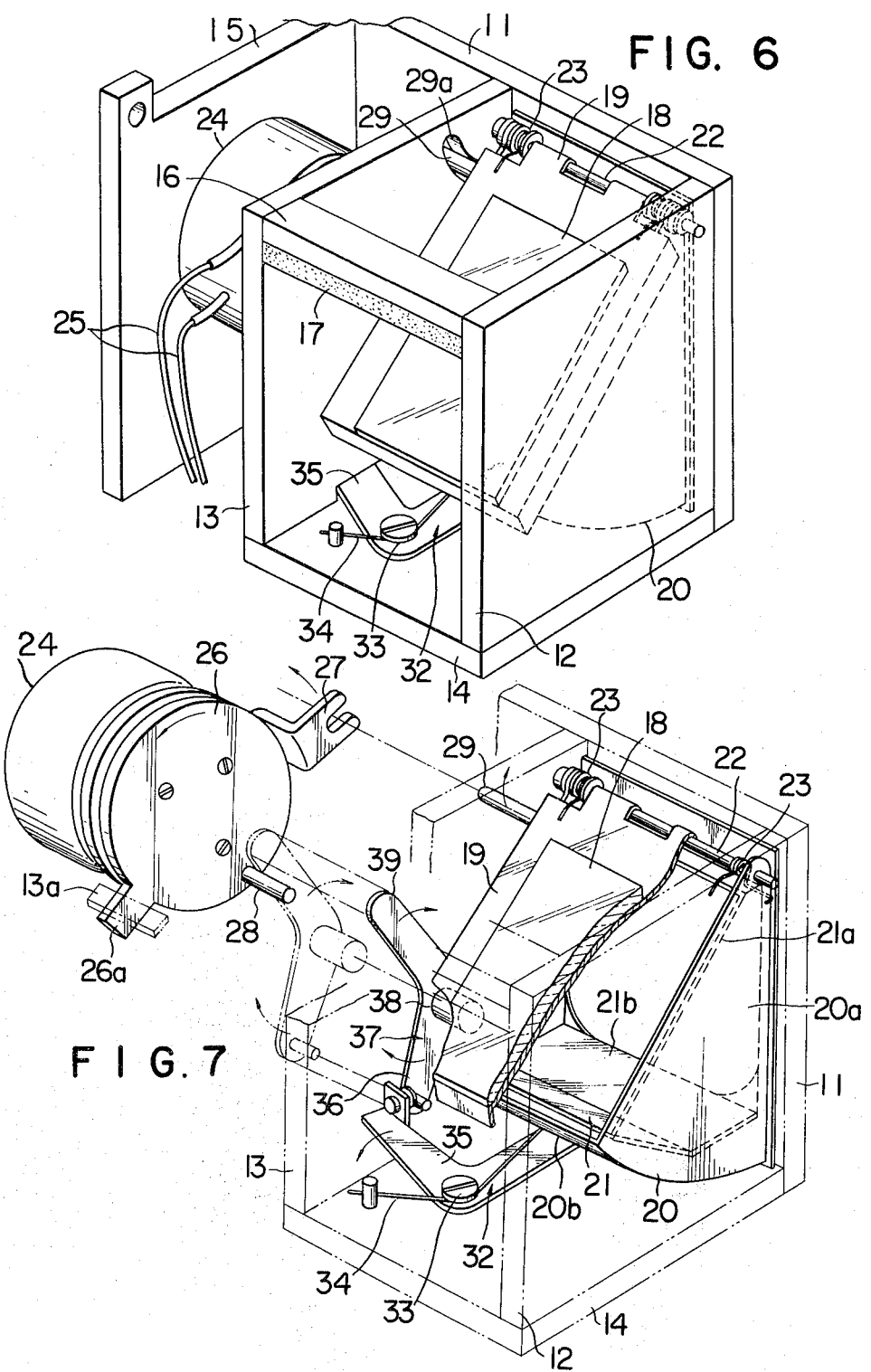

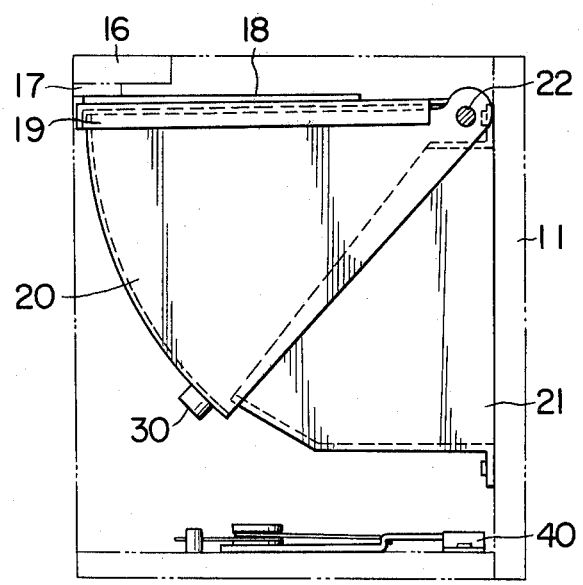
F I G. 12 ary buttressing means for buttressing the stud member, when the trailing shutter is at the fifth position, to place the stud member at a constant position relative to the latch means thereby to assure regular release timing thereof.

MIRROR-SHUTTER DEVICE IN SINGLE-LENS REFLEX CAMERA

BACKGROUND OF THE INVENTION

This invention relates to single-lens reflex cameras and more particularly to an improved mirror-shutter device in a single-lens reflex camera of the type using stroboscopic light to illuminate the object.

The type of single-lens reflex camera in which the mirror-shutter device of this invention is applicable comprises a photographic, or picture-taking, optical system, a finder optical system for viewing the object to be photographed, a film magazine containing a photographic film, and a mirror which is movable between a first position for reflecting light rays passing through the photographic optical system to the finder optical system and a second position for permitting light rays to pass to the film magazine.

SUMMARY OF THE INVENTION

It is an object of this invention to provide, in a single-lens reflex camera of the character described above, an improved mirror-shutter device having an accurate and positive operation.

According to this invention, briefly summarized, there is provided, in a single-lens reflex camera of the above described character, a mirror-shutter device comprising: a leading shutter supporting the mirror and hinged about a hinge axis to swing between first and second positions thereof to move the mirror between its first and second positions, respectively; a trailing shutter hinged about the same hinge axis to swing between first and second positions thereof at which the trailing shutter is in close contact with the leading shutter at the first and second position thereof, respectively; spring means for continually urging the leading and trailing shutters to swing mutually together into said close contact; driving means activated by a shutter release device of the camera to drive the leading shutter from its first position to its second position and thereafter to return the leading shutter from the fourth position to the third position; and locking means for releasably locking the trailing shutter in the fifth position, the locking means comprising a stud member fixed to the trailing shutter, latch means having a catch edge against which the stud member is normally caught and locked, intercoupling means for operating the latch means so as to cause the same to release the stud member, when the leading shutter has driven from the third position substantially to the fourth position during a specific interval, thereby to release the trailing shutter to permit the same to swing after, and closely contact the leading shutter under the force of the spring means, and stationary buttressing means for buttressing the stud member, when the trailing shutter is at the fifth position, to place the stud member at a constant position relative to the latch means thereby to assure regular release timing thereof.

The nature, utility, and further features of the invention will be more clearly apparent from the following detailed description with respect to a preferred embodiment of the invention when read in conjunction with the accompanying drawings, briefly described below.

BRIEF DESCRIPTION OF THE DRAWINGS

In the drawings;

FIG. 6 is a perspective view of the same device;

FIG. 7 is another perspective view, with parts cut away, showing particularly the principal moving parts of the device;

FIG. 12 is a righthand side elevation showing the two shutters in close contact at their respective second positions.

DETAILED DESCRIPTION OF THE INVENTION

Figure 1:
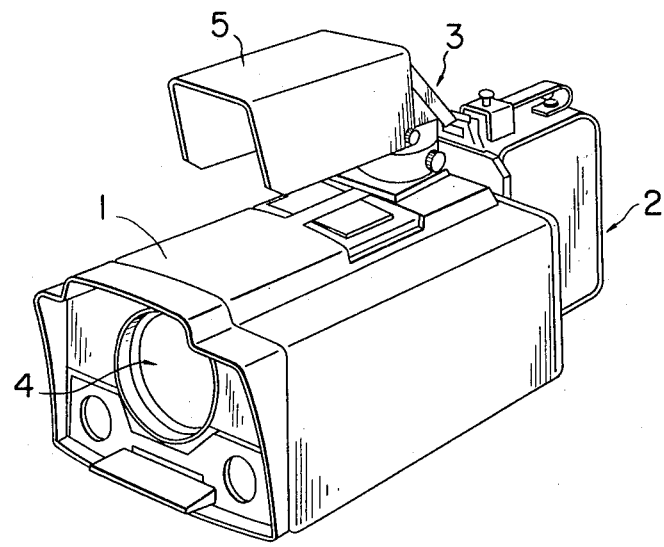
FIG. 1 is a perspective view showing the general exterior of a single-lens reflex camera in which the mirror-shutter device of the invention is applied.
Figure 2:
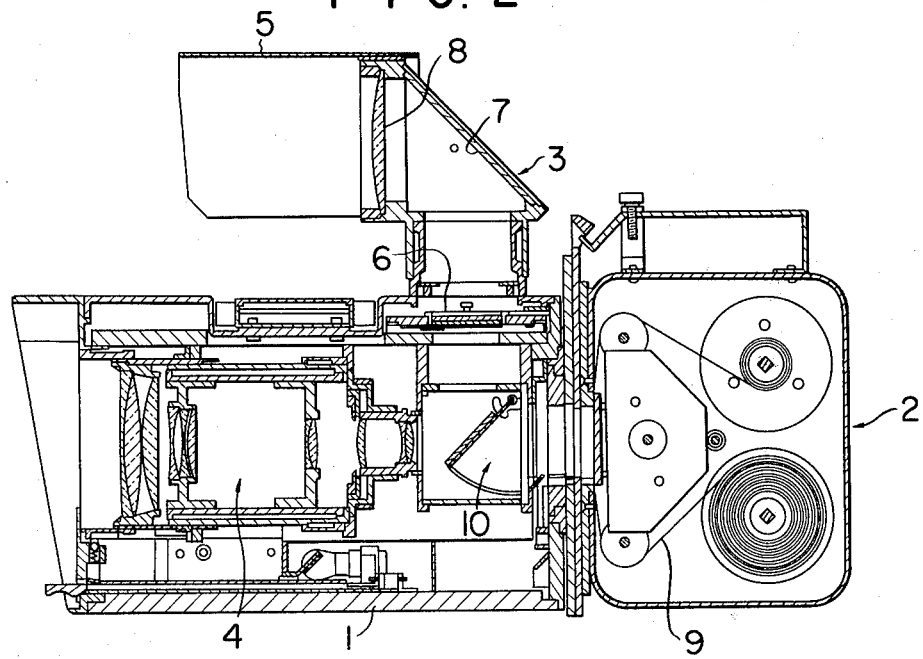
FIG. 2 is a left side elevation, in vertical section, of the camera shown in FIG. 1.

The mirror-shutter device of this invention is applicable to single-lens reflex cameras such as, for example, that illustrated in FIGS. 1 and 2. This camera has a main camera housing 1 and a film magazine 2 containing a film 9 and detachably secured to the rear face of the housing 1. The housing 1 houses a photographic optical system 4 and the mirror shutter device 10 of the invention interposed between the photographic optical system 4 and the rear face of the housing 1. A finder 3 is mounted on the housing 1 above the mirror shutter device 10 and has a finder optical system including a focus glass 6, which in this example is a Fresnel lens ground glass, a viewer mirror 7, and a viewer lens 8. In this example, the supporting and housing structure for the viewer mirror 7, and the lens 8 is of turret type, being swivelable relative to the housing 1 to enable the viewer to view the image from the lens 8 from any direction relative to the housing 1. The finder 3 is further provided with a hood 5.

Figure 3:
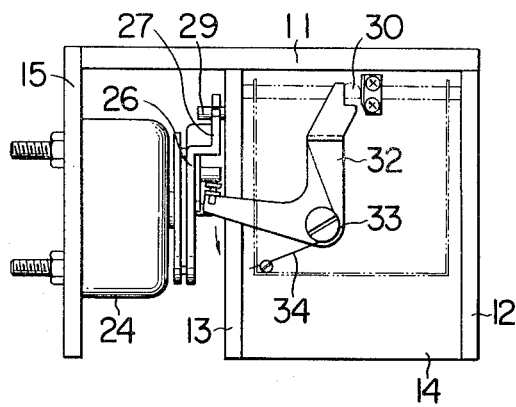
FIGS. 3, 4 and 5 are respectively a plan view, a front elevation, and a section taken along the line V—V in FIG. 4, with parts deleted for clarity, of one example of the mirror-shutter device of the invention.
Figure 4:
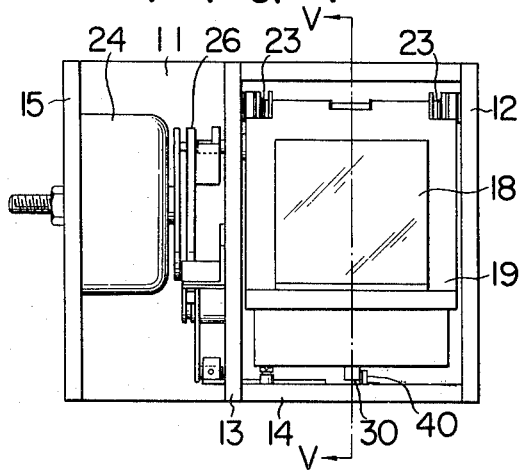

The mirror-shutter device of this invention, in the form of the illustrated example, is encased in a box-like support structure shown more clearly in FIGS. 3 and 6 and other figures and comprising a rear wall 11 perpendicular to the optical axis of the photographic optical system, a left side (as viewed from the rear side) wall 12, a right side wall 13, a bottom wall 14, and a solenoid support wall 15. The side walls 12 and 13, the bottom wall 14, and the solenoid support wall 15 are fixed at their respective rear edges perpendicularly to the rear wall 11. The side walls 12 and 13 and the solendoid support wall 15 are mutually spaced apart and parallel. The bottom wall 14 is perpendicular to the side walls 12 and 13 and is fixed at its left and right edges to the lower edges of the left and right side walls 12 and 13. In addition a crosspiece 16 supporting a buffer cushion 17 is fixed at its ends respectively to the upper front parts of the side walls 12 and 13.

The side walls 12 and 13, the bottom wall 14, and the portion of the rear wall 11 between the side walls 12 and 13 from therebetween a mirror-shutter chamber in which a mirror shutter is enclosed and operates as described hereinafter. The front part of this chamber is open to receive light rays passing rearward through the photographic optical system 4. The upper part of this chamber is also open to permit light rays reflected by the mirror of the mirror shutter to travel upward to the focus glass 6. The rear wall of this chamber is provided with an opening for passing the light rays from the photographic optical system 4 to the film 9 thereby to form thereon an image of the object when a mirror 18 of the mirror shutter is retracted upward for photographic operation.

The principal parts of the above mentioned mirror shutter are, as most clearly shown in FIG. 7, the mirror 18, which, when it is in its lowered position for view-finding, reflects the light rays from the photographic optical system 4 upward toward the focus glass 6 thereby to form thereon an image of the object, a leading shutter 19 supporting the mirror 18, a trailing shutter 20, a stationary shield 21 fixed to the rear wall 11, a transverse hinge shaft 22 supported at its ends by the left and right side walls 12 and 13 at their upper rear parts and pivotally supporting the leading and trailing shutters 19 and 20 at their upper rear parts, and parts of a mechanism for operating the mirror shutter as described hereinafter.

The leading shutter 19 is essentially a rectangular flat plate. In the illustrated example, it is formed from a thin metal sheet and has downwardly directed front and side flanges for strength and close fitting relative to the trailing shutter 20. The trailing shutter 20 is also formed from a thin metal sheet and has a shape resembling that of one of the jaws of a two-jaw clamshell bucket used for excavation. That is, the trailing shutter 20 has two side flanges 20a of sectorial shape joined by a transverse web 20b of arcuate shape in section taken in the fore-and-aft direction. The stationary shield 21 is also formed from a thin metal sheet and has two substantially triangular side flanges 21a joined by a transverse web 21b of dihedral shape having a substantially horizontal rear part and upwardly inclined front part.

The transverse width of the leading shutter 19 is slightly less than the distance between the parallel inner wall surfaces of the side walls 12 and 13, permitting the leading shutter 19 to swing freely in the mirror-shutter chamber. The transverse width of the trailing shutter 20 is slightly less than that of the leading shutter 19 thereby to permit the upper edges of the trailing shutter 20 to fit snugly into the leading shutter 19 after the shutter operation described hereinafter. The transverse width of the stationary shield 21 is still less to permit the trailing shutter 20, which is positioned in an encompassing manner about the shield 21 with minimum clearance therebetween, to swing freely.

Two coil springs 23, 23 are disposed around the transverse hinge shaft 22 respectively near the ends thereof and exert oppositely acting torques respectively on the leading shutter 19 and the trailing shutter 20, that is, torques urging the two shutters 19 and 20 to swing toward each other about the hinge shaft 22 irrespective of their angular positions about the hinge shaft. In its lowered position for view-finding, the mirror shutter is in the state shown in FIG. 5, wherein the rear edge of the trailing shutter 20 is abuttingly contacting the rear wall 11, and its front edge is snugly fitted in the lower side of the leading shutter 19.

The mirror-shutter mechanism is operated at the time of photographing or picture taking by a mechanism as described below which has as its prime driving actuator a rotary solenoid 24 mounted on the aforementioned solenoid support wall 15. This rotary solenoied 24 is energized by an electrical system (not shown) through conductors such as at 25 (FIG. 6), and its mechanical output is derived from its rotary plate 26. As most clearly shown in FIG. 7, the rotary plate 26 is fixedly provided thereon with an actuating yoke 27, an actuating pin 28, a lug 26a, and a photo-coupler (not shown), all disposed in predetermined positions offset from the axis of rotation of the rotary plate 26.

The yoke 27 is engaged with a pin 29 fixed to the right side of the leading shutter 19 at a finite distance from the hinge shaft 22 and extending toward the right through and beyond an arcuate slot 29a formed in the right side wall 13. Accordingly, a counterclockwise (as viewed from the left side toward the right side) rotation of the rotary plate 26 is transmitted through the yoke 27 and pin 29 to cause the leading shutter 19 to swing clockwise toward its picture taking position. Any such clockwise rotation of the leading shutter 19 would always cause a like rotation unitarily therewith of the trailing shutter 20 because of the above described action of the coil springs 23, 23 if it were not for a locking mechanism as described below.

Figure 5:
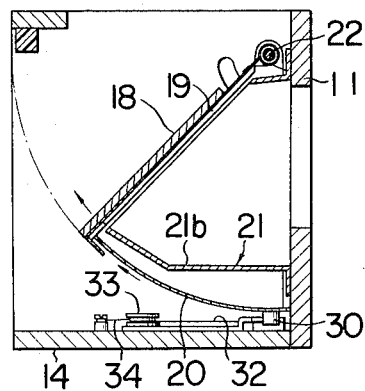
Figure 8:
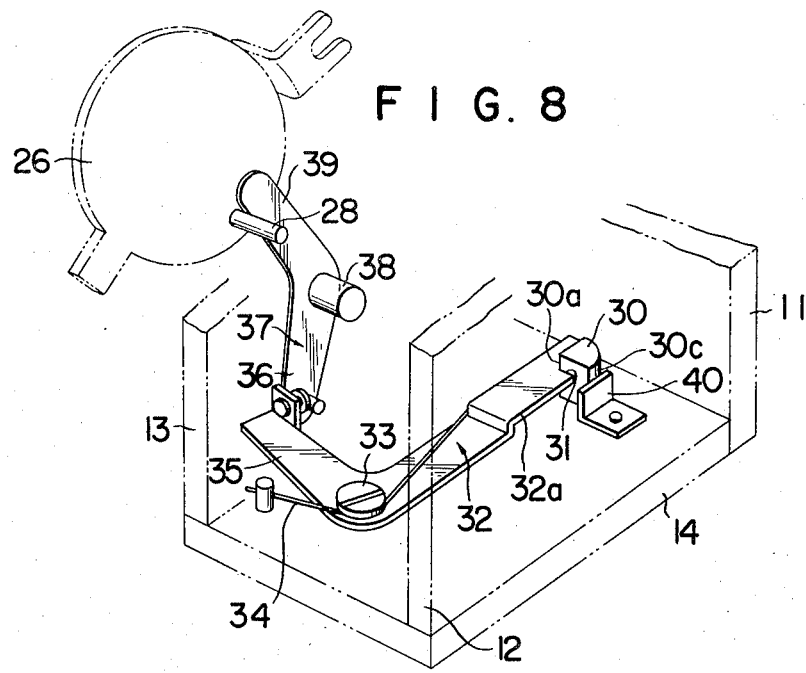
FIG. 8 is still another perspective view showing a mechanism for releasably locking a trailing shutter and a mechanism actuated by a rotary solenoid and actuating the locking mechanism, which in the figure is in its locking state.
Figure 10:
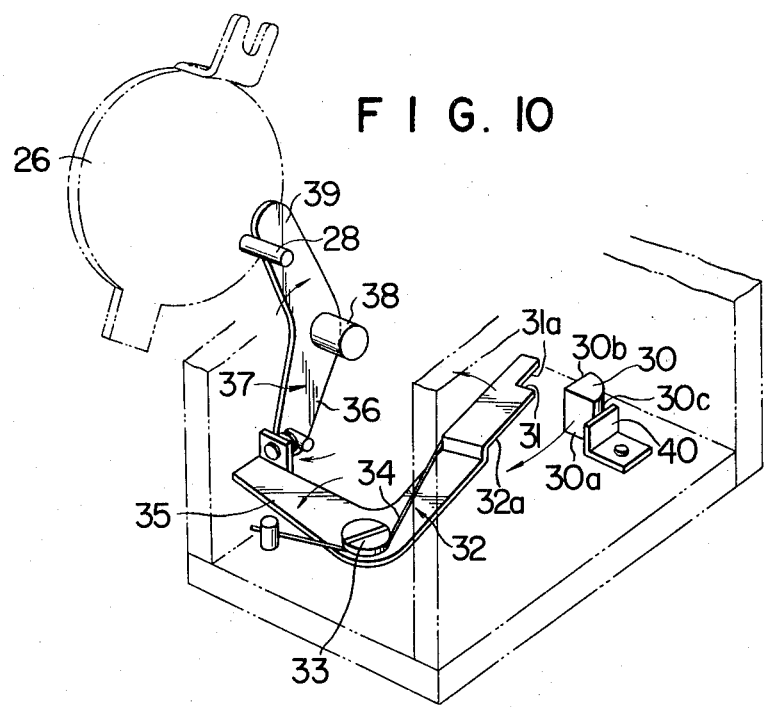
FIG. 10 is another perspective view showing the locking mechanism at the instant when it releases the trailing shutter.

A stud member 30 is fixed to the lower surface of the trailing shutter 20, as shown in FIG. 5, at a position near its rear edge midway between its left and right sides and extends downward but is clear of the bottom wall 14. Every time the trailing shutter 20 swings counterclockwise into its full lowered position as shown in FIG. 5, this stud member 30 is locked, as shown in FIG. 8, by a catch edge 31 of one arm of a latch lever 32 of bellcrank shape pivotally supported by a vertical pivot pin 33 on the bottom wall 14. As shown in FIG. 10, the stud member 30 has a front face 30a, a side face 30b extending transversely to the front face 30a, and a curved convex rear face 30c. Because of the torque imparted by the coil springs 23, 23, any departure of the leading shutter 19 upward from its lowermost position for view-finding applies a torque to the trailing shutter 20 urging it to follow the leading shutter 19 in the clockwise direction. This is prevented by the catch edge 31 abutting against the front face 30a of the stud member 30 until the latch lever 32 is actuated to release the stud member 30 as described hereinafter.

The latch lever 32 is urged by a spring 34 to turn clockwise (as viewed from above) to bring the catch edge 31 against the stud member 30. The other arm 35 of the latch lever 32 is engageable by one arm 36 of a bellcranck lever 37 rotatably supported by a horizontal pivot pin 38 fixed to the right side of the right side wall 13. The other arm 39 of the lever 37 is engageable by the aforementioned actuating pin 28.

An important feature of this invention is the provision of means for buttressing the stud member 30 against any side displacement in the transverse direction, i.e., to the left, at the time when it is engaged by the catch edge 31 of the latch lever 32. If it were not for this buttressing means, there would be a possibility of the stud member 30 yielding slightly toward the left because of play between the hinge shaft 22 and the bearing parts of the trailing shutter 20 pivotally engaged with the hinge shaft 22 when the catch edge 31 moves leftward and begins to engage the stud member 30. Such yielding and leftward displacement of the stud member 30 would give rise to a partial and improper engagement thereof by the catch edge 31, which would in turn cause irregularity in the timing of the shutter release because the transverse position of the stud member 30 in its locked state would fluctuate relative to the catch edge 31. In the illustrated embodiment of the invention, the buttressing means is in the form of a bracket 40 fixed to the bottom wall 14.

The mirror-shutter device of the above described construction according to this invention operates in the following manner. Throughout the following description, the directions of rotation in a vertical plane are those as viewed from the left side toward the right side, and the directions of rotation in a horizontal plane are those as viewed downward from above.

Immediately prior to the actual picture-taking operation, the leading shutter 19 supporting the mirror 18 and the trailing shutter 20 are in their lowered positions, as shown in FIG. 5, for view-finding by means of the mirror 18, the focus glass 6, the viewer mirror 7, and the lens 8 in the conventional manner. Then, when the operator is satisfied with the viewed image, he presses a shutter release button (not shown), whereupon the rotary solenoid 24 is energized by the electrical system briefly mentioned hereinbefore.

The rotary plate 26 of the rotary solenoid 24 thereupon rotates counterclockwise. The yoke 27 thereby lifts the pin 29. As a consequence, the leading shutter 19 is rotated clockwise toward its raised position. At the same time, the actuating pin 28 on the rotary plate 26 is advancing toward the arm 39 of the bellcrank lever 37.

Figure 9:
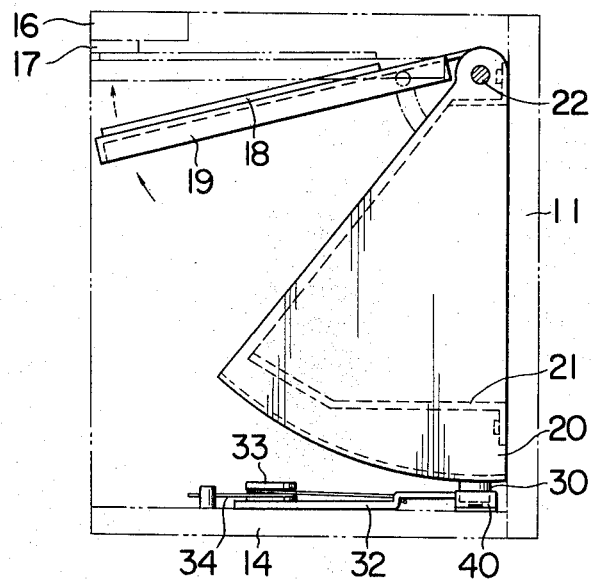
FIG. 9 is a righthand side elevation of the device in a state wherein a leading shutter is being driven to its second position, but the trailing shutter is being locked in cocked state in its first position by the locking mechanism.

The leading shutter 19 is thus rotated clockwise, as shown in FIG. 9, counter to the torque due to the springs 23, 23, which torque is increasing as the angular displacement of the leading shutter 19 increases. An increasing counter-torque is applied by these springs 23, 23 to the trailing shutter 20, which is thereby urged to follow and catch up with the leading shutter 19 but is still locked and prevented by doing so by the catch edge 31 abutting against the stud member 30. As a result, a gap or aperture of increasing size is formed between the leading shutter 19 and the trailing shutter 20.

Figure 11:
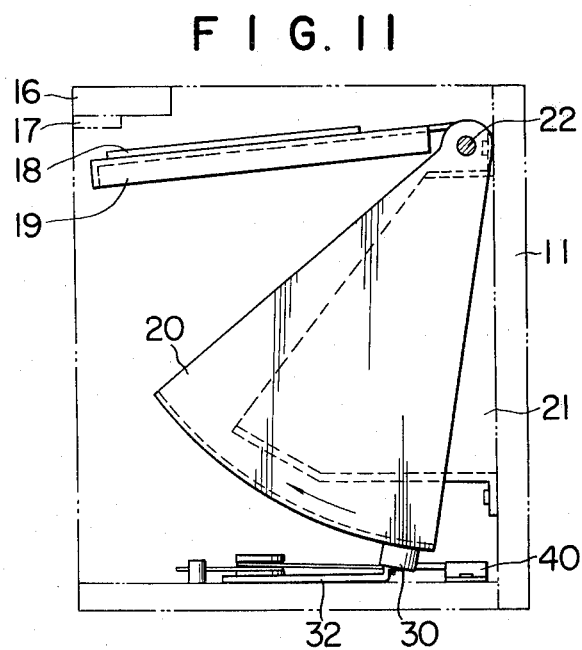
FIG. 11 is a righthand side elevation showing the released trailing shutter starting to swing upward into its second position of close contact with the leading shutter.

Then, when the leading shutter 19 is substantially at its uppermost position as shown in FIG. 11, the aforementioned photo-coupler (not shown) is operated to cause a stroboscope to emit light. The resulting reflected light rays from the object pass through the photographic optical system 4 and the above mentioned aperture between the two shutters 19 and 20 and form an image on the film 9. On one hand, the actuating pin 28 has contacted the arm 39 of the bellcrank 37, which has thereby started to rotate clockwise, causing the latch lever 32 to turn counterclockwise, from the position shown in FIG. 8 to that shown in FIG. 10, and the catch edge 31 to slide toward the right relative to the stud member 30.

Then, at a preset instant immediately after the emission of light by the stroboscope, the catch edge 31 slips off the front face 30a of the stud member 30, which is thereby released. The trailing shutter 20, now being acted upon by the maximum torque of the springs 23, 23, is swung as indicated in FIG. 11, thereby in the clockwise direction into close contact with the leading shutter 19, thereby closing the above mentioned aperture therebetween as illustrated in FIG. 12. The rotary solenoid 24 then reverses its rotation and returns to its original state in which the lug 26a of the rotary plate 26 abuts against a stop 13a (FIG. 7) fixed to the side wall 13, whereby the two shutters are also returned unitarily to their original state wherein they are at their lowermost and rearmost position.

Near the end of this return motion of the trailing shutter 20, the stud member 30 fixed thereto slides along the left side edge 32a (FIGS. 8 and 10) of the latch lever 32, forcing it to turn counterclockwise against the force of the spring 34. Then, when the front face 30a of the stud member 30 reaches the catch edge 31, the latch lever 32 is released, and the catch edge 31 slides leftward relative to the stud member 30, as a result of the force of the spring 34, until a side edge 31a at the end of the latch lever 32 contacts the side face 30b of the stud member 30. Before the stud member 30 is thus locked, it has slid into contact against the aforedescribed buttressing bracket 40 and is thereby rigidly buttressed against the leftward forces due to friction between it and the catch edge 31 and due to the side edge 31a pressing against the side face 30b of the stud member 30. The curved rear face 30c of the stud member 30 ensures smooth movement of the stud member to the locked position without being obstructed by the buttressing bracket 40. Thus, the relative positions of the catch edge 31 and the stud member 30 are caused to be always constant, whereby regular timing of release of the trailing shutter 20 is assured.

What I claim is:

1. In a single-lens reflex camera having a photographic optical system, a finder optical system, a film magazine, and a mirror which is movable between a first position for reflecting light rays passing through the photographic optical system to the finder optical system and a second position for permitting light rays to pass to the film magazine, the combination therewith of a mirror-shutter device comprising:

a leading shutter supporting the mirror and hinged about a hinge axis to swing between third and fourth positions thereof to move the mirror between the first and second positions, respectively;

a trailing shutter hinged about the same hinge axis to swing between fifth and sixth positions thereof at which the trailing shutter is in close contact with the leading shutter at the third and fourth positions, respectively;

spring means for continually urging the leading and trailing shutters to swing mutually together into said close contact;

driving means activated by a shutter release device of the camera to drive the leading shutter from the third position to the fourth position and thereafter to return the leading shutter from the fourth position to the third position; and locking means for releasably locking the trailing shutter in the fifth position, said locking means comprising a stud member fixed to the trailing shutter, latch means having a catch edge against which the stud member is normally caught and locked, resilient means urging the latch means to the stud member, intercoupling means for operating the latch means so as to cause the same to release the stud member, when the leading shutter has driven from the third position substantially to the fourth position during a specific interval, thereby to release the trailing shutter to permit the same to swing after, and closely contact the leadng shutter under the force of the spring means, and stationary buttressing means for buttressing the stud member, when the trailing shutter is at the fifth position, to place the stud member at a constant position relative to the latch means thereby to assure regular release timing thereof.

2. A mirror-shutter device according to claim 1 wherein said catch edge of the latch means extends transversely to the direction from the fifth position toward the sixth position of the trailing shutter in which direction the stud member of the trailing shutter in the fifth position is urged by the spring means, the latch means also having a side edge extending transversely to the catch edge, and wherein the stud member has a front face adapted to engage the catch edge of the latch means, and a side face extending transversely to the front face so as to engageable with said side edge of the latch means, said latch means being movable, for releasing the stud member, in a direction in which the side edge thereof moves away from the associated side face of the stud member and in which the catch edge thereof slides along the associated front face of the stud member, said buttressing means being located in such a position that the stud member of the trailing shutter in the fifth position is interposed between said side edge of the latch means and the buttressing means.

3. A mirror-shutter device according to claim 1 or 2 wherein said latch means is a latch lever mounted on a stationary pivot pin and said intercoupling means is a bellcrank lever mechanism intercoupling the drive means and the latch lever.

4. A mirror-shutter device according to claim 1 or 2 wherein said stud member is substantially in the form of a sector in cross section, havng a curved convex rear face connecting the ends of the front and side faces, opposite to the ends thereof where the front and side faces cross each other.

5. A mirror-shutter device according to claim 4 wherein said buttressing means is a planar bracket having a face engageable with said rear face of the stud member.

* * * * *